(12) United States Patent
Nishiyama

(10) Patent No.: US 7,165,148 B2
(45) Date of Patent: Jan. 16, 2007

(54) DATA PREFETCH METHOD FOR INDIRECT REFERENCES

(75) Inventor: Hiroyasu Nishiyama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/189,705

(22) Filed: Jul. 27, 2005

(65) Prior Publication Data

US 2005/0262308 A1    Nov. 24, 2005

Related U.S. Application Data

(63) Continuation of application No. 10/067,243, filed on Feb. 7, 2002, now Pat. No. 6,934,808.

(30) Foreign Application Priority Data

Sep. 28, 2001    (JP) .............................. 2001-299718

(51) Int. Cl.
*G06F 12/00*    (2006.01)
(52) U.S. Cl. ........................ 711/137; 711/118; 712/209
(58) Field of Classification Search ................ 711/137, 711/118; 712/209
See application file for complete search history.

(56) References Cited

U.S. PATENT DOCUMENTS

| 5,704,053 A | 12/1997 | Santhanam |
| 6,567,975 B1 | 5/2003 | Damron |
| 2003/0145314 A1 | 7/2003 | Nguyen et al. |

OTHER PUBLICATIONS

T. C. Mowry et al., "Design and Evaluation of a Compiler Algorithm for Prefetching", pp. 62-73, 1992.
V. Santhanam et al., "Data Prefetching on the HP PA-8000", pp. 264-273, 1997.

*Primary Examiner*—Kimberly McLean-Mayo
(74) *Attorney, Agent, or Firm*—Mattingly, Stanger, Malur & Brundidge, P.C.

(57) ABSTRACT

To improve the execution performance of a program which makes indirect array reference by performing data prefetching also on an indirect reference array while reducing an instruction overhead, locality in data reference which cannot be detected by a conventional compiler is enabled to be detected by a user instruction or analysis by a compiler on the basis of a tendency that values of indices in an indirect reference array monotonously increase or decrease. By using the information, issuing of redundant prefetch instructions is suppressed, and data prefetching is enabled to be performed also on an indirect reference array.

3 Claims, 6 Drawing Sheets

FIG. 3A

DO i=1,N
  s=s+A[L[i]]
END DO

Prior Art

FIG. 3B

DO i=1,N,4
  PREFETCH L[i+$\alpha$]
  s=s+A[L[i]]
  s=s+A[L[i+1]]
  s=s+A[L[i+2]]
  s=s+A[L[i+3]]
END DO

Prior Art

FIG. 3C

DO i=1,N,4
  PREFETCH L[i+2$\alpha$]
  t0= L[i+$\alpha$]
  PREFETCH A[t0]
  t1= L[i+1+$\alpha$]
  PREFETCH A[t1]
  t2= L[i+2+$\alpha$]
  PREFETCH A[t2]
  t3= L[i+3+$\alpha$]
  PREFETCH A[t3]
  s=s+A[L[i]]
  s=s+A[L[i+1]]
  s=s+A[L[i+2]]
  s=s+A[L[i+3]]
END DO

Prior Art

FIG. 6

-array_index L=2

FIG. 7

```
*option increase(L,2)
DO i=1,N
  s=s+A[L[i]]
END DO
```

FIG. 8

```
DO i=1,N
  L[i]=i*2
END DO
```

FIG. 9

```
DO i=1,N,4
  PREFETCH L[i+α]
  t0=L[i+α]
  PREFETCH A[t0]
  s=s+A[L[i]]
  s=s+A[L[i+1]]
  s=s+A[L[i+2]]
  s=s+A[L[i+3]]
END DO
```

as to just move data from the main memory to the cache memory, so that when the movement of data to the cache is seen from an application program, only the number of cycles at the time of loading data changes.

DATA PREFETCH METHOD FOR INDIRECT REFERENCES

CROSS REFERENCE TO RELATED APPLICATION

This application is a continuation of U.S. application Ser. No. 10/067,243, filed on Feb. 7, 2002, now U.S. Pat. No. 6,934,808 which is incorporated by reference herein in its entirety.

BACKGROUND OF THE INVENTION

The present invention relates to a data prefetch method and, more particularly, to a compiling method for realizing high-speed indirect array reference by effectively using prefetching for a processor having a prefetch instruction.

The performance of a microprocessor is being dramatically improved with improvements in parallel processing at the instruction level and in frequency. In contrast, improvements in performance of a DRAM as a component of a main memory of a computer remains at a low level as compared with the improvements in performance of a processor. Consequently, there is a tendency that the number of cycles required to refer to a main memory is increasing.

As shown in FIG. 2, in many microprocessors, as a method of hiding the time required to refer to the main memory, a memory of a small capacity called a cache which can be referred to at higher speed as compared with the main memory is disposed between a processor and a main memory and data referred to recently is stored in the cache, thereby shortening the time required to refer to the main memory. By the method alone, however, a waiting time occurs in the case where data which is not stored in the cache is referred to, so that a data prefetch instruction for transferring data in a designated address in advance from the main memory to the cache in parallel with execution of another instruction is provided.

A compiler analyzes a source program and optimizes code for generating a prefetch instruction so that the cycle of referring to the maim memory can be hidden. In this case, data length used for computation is generally about 1 to 8 bytes. Data transfer from a main memory to a cache is performed on the basis of a unit called a cache line of 128 or 64 bytes. Therefore, by one data prefetch, data to be referred to by plural repetition of a loop can be transferred to the cache.

In a conventional technique as disclosed in literature "Design and Evaluation of a Compiler Algorithm for Prefetching", by T. C. Mowry et al., Proceedings of the 5th International Conference on Architectural Support for Programming Languages and Operating Systems, pp. 62–73, 1992, spatial locality or temporal locality of data reference in a loop is obtained by analyzing array indices in the loop and, when a reuse rate is equal to or higher than a predetermined value, prefetching is performed. In this case, by combining the prefetching with loop unrolling, redundant prefetching to the same cache line is prevented, thereby reducing an instruction overhead incurred by prefetching.

The conventional technique will be described by using FIGS. 3A to 3C.

FIG. 3A shows an example of source code for performing a loop iteration process using indirect reference, to which the invention is applied to produce an effect. The code instructs execution of a process for computing the sum of values of an array A[ . . . ] by using the values of an array L[ . . . ] as indices from i to N. Such indirect reference code is frequency used for a process on a sparse matrix, or the like.

FIG. 3B shows an example of code which is obtained by optimizing the source code by the conventional technique and in which a prefetch instruction is inserted. In the conventional technique, an array index is analyzed at the time of compiling and only an array reference in which the reuse rate of a cache line is high is prefetched. Consequently, only the array L[ . . . ] which is continuously referred to becomes an object to be prefetched, and the array A[ . . . ] of which reuse rate is unknown does not become an object to be prefetched. α denotes the number of times of loop iteration until data arrives from the main memory to the cache by prefetching. In the example, it is assumed that the size of the cache line of the processor is 32 bytes. If the length of data used for computation is eight bytes for example, data of four elements are transferred in a lump from the main memory. Therefore, in the example, code is generated to perform prefetching once every four times of iteration.

In the conventional method as well, by always issuing the prefetch with respect to the array A[ . . . ] in which the reuse rate of the cache line is unknown, the array A[ . . . ] can be set as an object to be prefetched. In this case, however, it is necessary to issue a prefetch per indirect reference, and an instruction overhead increases. FIG. 3C shows an example of the code optimized in such a manner. When the code shown in FIG. 3C is compared with the code shown in FIG. 3B, the number of instructions for reference to the indices for prefetching and for prefetching of the array A[ . . . ] is larger in FIG. 3C. Due to this, prefetching for indirect reference is not performed.

SUMMARY OF THE INVENTION

In the code optimized by the conventional technique, a cache miss cycle at the time of reference to the array which is indirectly referred to cannot be hidden while reducing the instruction overhead for prefetching indirect reference data. It causes a problem such that execution performance of a program deteriorates.

In the conventional technique, the overhead for prefetching the indirect reference array is increased for the reason that a compiler assumes from the result of analysis of the program that the values of elements of the index array are discrete. When the values of elements of the index array are discrete, the reuse rate is low. Since the elements of the index array can be arbitrary values, such assumption is necessary so as not to perform invalid optimization.

In an actual program, however, the values of elements of the index array are not completely discrete but are often almost continuous values locally like {1, 2, 3, 4, 6, 7, 8, 9, 51, 52, 53, 54, 56, . . . }. The prefetch instruction is to just move data from the main memory to the cache memory, so that when the movement of data to the cache is seen from an application program, only the number of cycles at the time of loading data changes.

It is therefore understood that, even if there is partly a discrepancy between the result of recognition that the values of the index array are continuos or change according to a predetermined rule and the values of the index array in an actual operation of the program, there is no difference in the result of the program.

According to the invention, by recognizing, on the basis of analysis of a compiler, a user instruction, or the like, the case having a high possibility that the values of an index array are continuous or change according to a predetermined rule, the problem in the conventional technique such that a cache miss cycle at the time of referring to an array which is indirectly referred to cannot be hidden while reducing an instruction overhead caused by prefetching of indirect reference data is solved.

Specifically, first, it is recognized from analysis of a compiler, a user instruction, or the like that values of an index array have predetermined increment values. As a result, it is understood that array elements which are referred to by using the index array as indices are referred to at predetermined address intervals. Consequently, by combining prefetching with the optimization of the conventional technique such as loop unrolling, prefetch is issued every predetermined loop iteration. As a result, an increase in the number of prefetch instructions for indirect reference array, which refers to the same cache line can be suppressed.

The above makes it possible to apply the prefetching to the indirect reference array while suppressing an increase in the overhead of the number of instructions for prefetching. Together with the effect of hiding the cycle of referring to a memory by executing a prefetch instruction, the improved execution performance of the program can be achieved.

BRIEF DESCRIPTION OF THE DRAWINGS

FIG. 3A is an example of source code for performing a loop iteration process accompanying indirect reference, to which the invention is effectively applied, and FIGS. 3B and 3C are diagrams each showing an example of an optimized program by introducing prefetching by the conventional technique.

FIG. 6 is a diagram showing an example of a compiler option for instructing an increment value of an index array L by a compiler option in order to determine whether indirect reference in a loop is continuous or not.

FIG. 7 is a diagram showing an example of instructing an increment value of the index array L by a directive in order to determine whether indirect reference in a loop is continuous or not.

FIG. 8 is a diagram showing an example of index array definition code.

FIG. 9 is a diagram showing an example of an optimized program by introducing prefetching in accordance with the invention.

DESCRIPTION OF THE PREFERRED EMBODIMENT

An embodiment of the invention will be described herein below with reference to the drawings.

Figure 2:
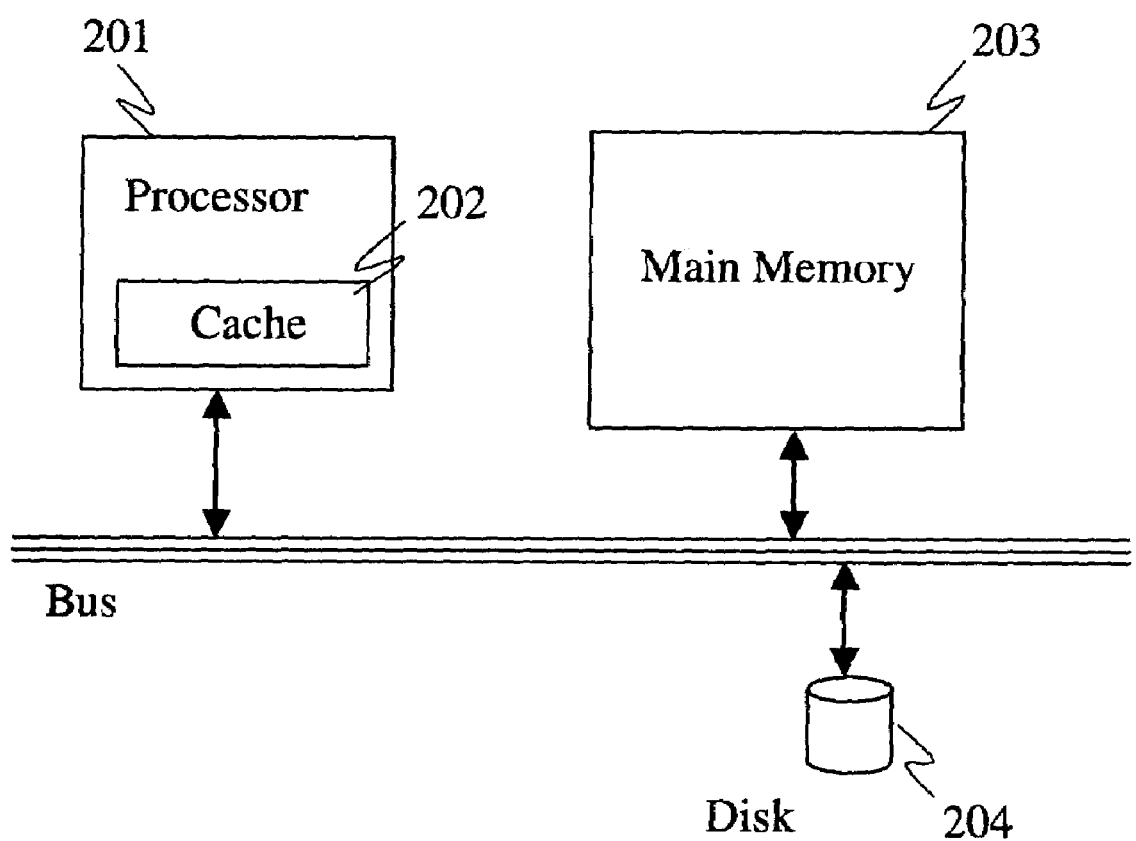
FIG. 2 is a block diagram showing an example of a computer system for carrying out the invention.

FIG. 2 shows an example of a computer system for carrying out the invention. The computer system has a microprocessor 201 including a cache memory 202, a main memory 203, and a disk 204. A program is stored in the disk 204. A compiler and a source program are stored in the disk 204 and loaded to the processor 201 to perform a compiling process. A program for a result of compiling is stored in the disk 204, similarly, loaded to the processor 201 and executed. In the case of executing a normal memory referring instruction by the processor 201, first, whether data to be referred to exists in the cache memory 202 or not is checked. If the data exists in the cache memory 202, the data is referred to. If the data to be referred to does not exist in the cache memory 202, the data on the main memory 203 is referred to and a copy of a cache line to which the data is belonging is stored in the cache memory 202. Since the cache memory is referred to at speed higher than the main memory, when data to be referred to exists on the cache memory, waiting time which occurs by referring to the memory can be reduced. A prefetch instruction is an instruction for moving the cache line to which data to be referred to belongs from the main memory 203 to the cache memory 202 concurrently with execution of another instruction. By issuing a prefetch instruction in advance only by the number of cycles sufficient to move the cache line from the main memory 203 to the cache memory 202, another instruction can be executed during transfer of data from the main memory 203 to the cache memory 202, so that waiting time for referring to the data is eliminated.

Figure 1:
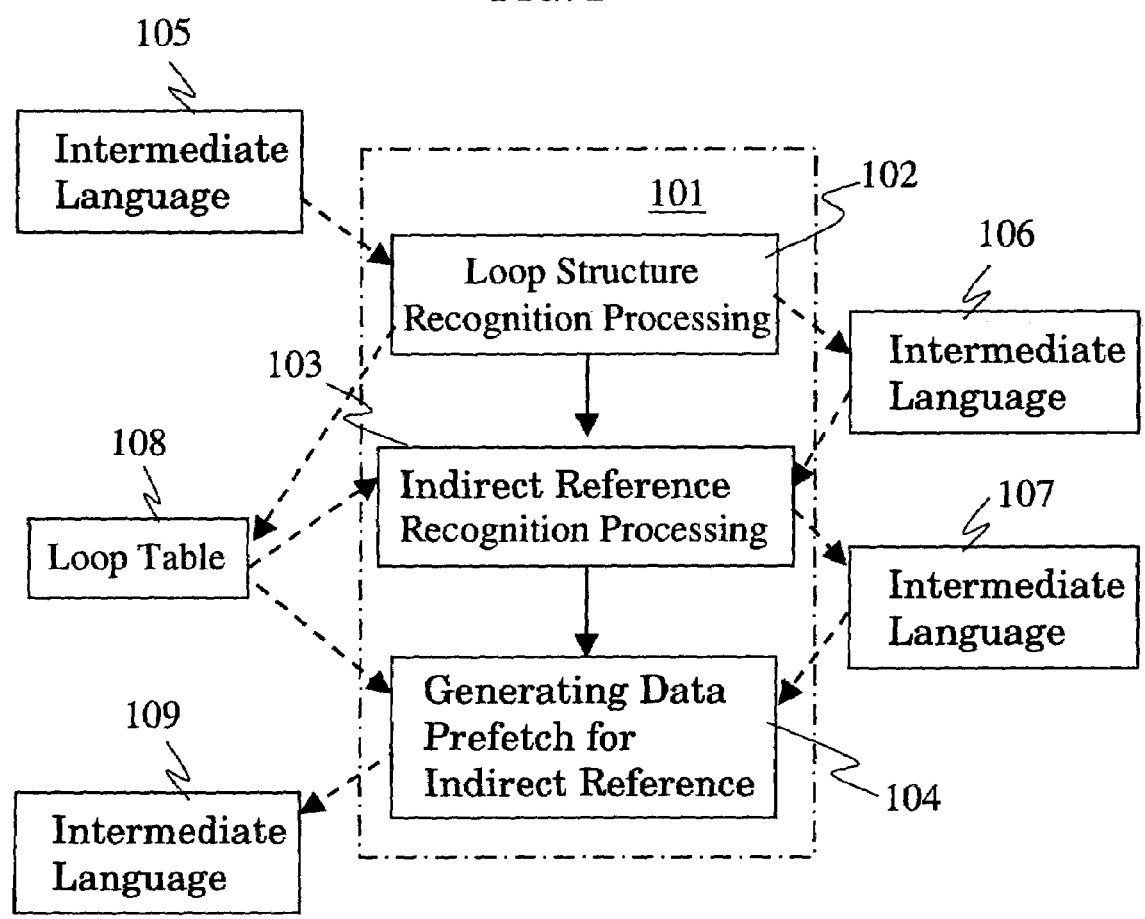
FIG. 1 is a diagram showing an example of the structure of the flow of an optimization process of a compiler for carrying out the invention.

FIG. 1 shows an example of the structure of the flow of an optimization process of a compiler which carries out the invention. In FIG. 1, solid lines indicate the flow of control, and broken lines indicate the flow of data. Although the flow of the optimization process of the compiler generally includes various optimization processes, only processes related to the present invention are shown here.

In the embodiment shown in FIG. 1, an optimization processing 101 for generating a prefetch instruction for indirect reference is applied to an intermediate language 105 to generate an intermediate language 109. In the optimization processing 101, first, the intermediate language 105 is analyzed by a loop structure recognition processing 102 to recognize a loop in the program, and an intermediate language 106 and a loop table 108 are generated. Subsequently, in an indirect reference recognition processing 103, an analysis is made regarding the loop recognized by the loop structure recognition processing 102 to recognize indirect reference in the loop. In an indirect reference prefetch generation processing 104, a prefetch instruction for the recognized indirect reference is generated, and the optimized intermediate language 109 is generated. Among the above processings, the loop structure recognition processing 102 and the indirect reference recognition processing 103 can be performed by conventional techniques as disclosed in, for example, "Compilers: Principles, Techniques and Tools", by A. V. Aho et al., Addison-Wesley, 1986 (Chapter 9: Code Generation, pp. 513–584, and Chapter 10: Code Optimization, pp. 585–722.

Figure 4:
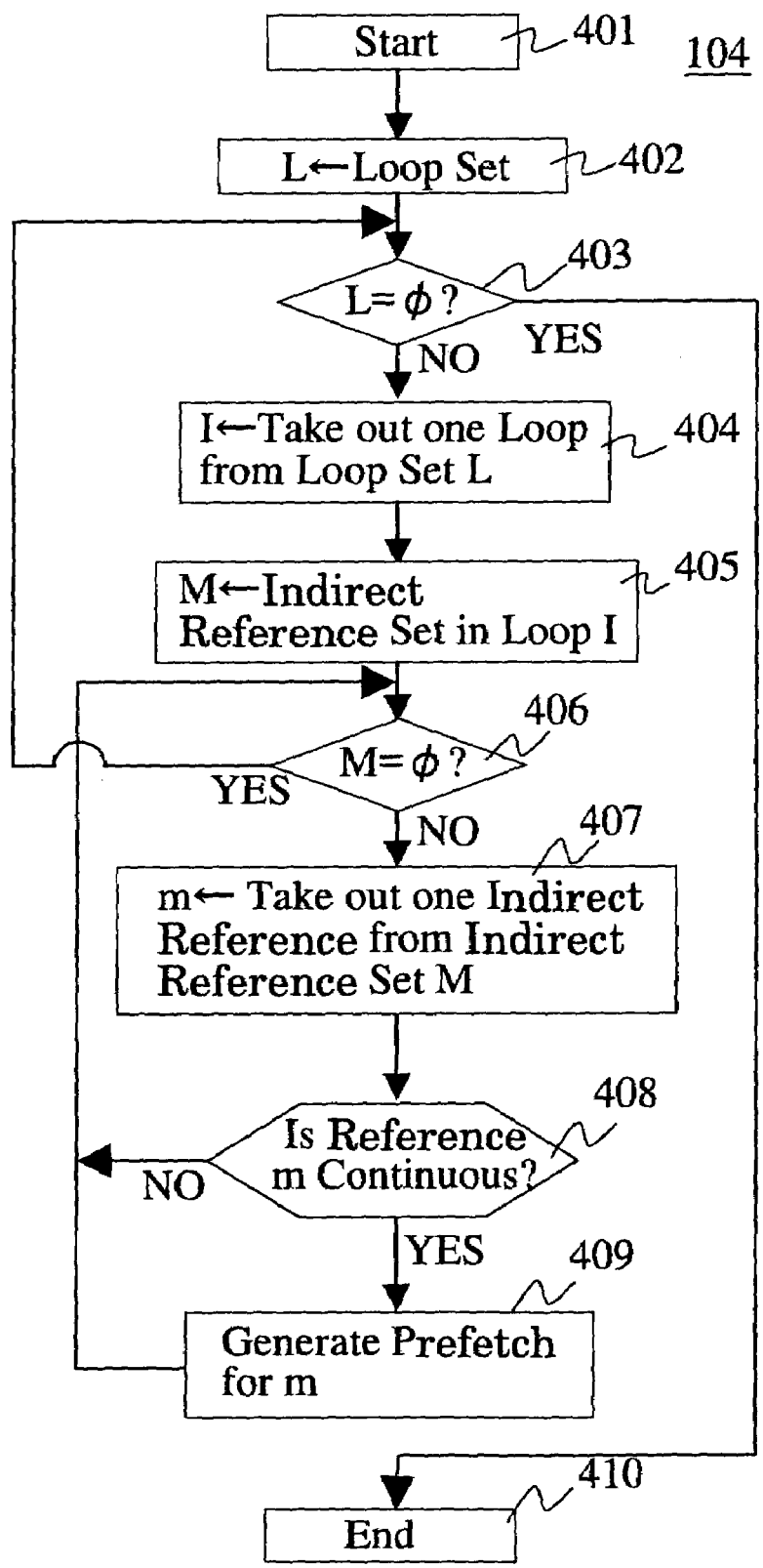
FIG. 4 is a diagram showing an example of the flow of an indirect reference prefetching process according to the invention.

FIG. 4 shows the flow of the indirect reference prefetch generation processing 104 as a process characterizing the invention. The indirect reference prefetch generation processing 104 is started in step 401. In step 402, a loop set in the program is assigned to a variable L by referring to the loop table 108 in FIG. 1. In step 403, whether the set L is an empty set or not is determined. If no loop to be processed exists, the control shifts to step 410 where the processing is finished. If there is a loop to be processed, one element is taken out from L and assigned to a variable l. In step 405, with reference to the result of the indirect reference recognition processing 103 in FIG. 1, an indirect reference set in an loop l is assigned to a variable M. In step 406, whether the set M is an empty set or not is checked. If YES, the control is shifted to step 403 and the next loop is processed.

If NO, the control is shifted to step 407 where one indirect reference is taken out from the set M and assigned to a variable m. In step 408, the indirect reference assigned to the variable m is checked to see whether the reference to (m) is continuous or not. If YES, an effect of hiding the cycle of referring to the main memory by prefetching can be expected, so that the control is shifted to step 409 where a prefetch instruction for indirect reference is generated. If NO, the effect of hiding the cycle of referring to the main memory by prefetching cannot be expected, so that the control is shifted to step 406 where the next indirect reference is processed. With respect to the generation of a prefetch instruction in step 409, by using techniques as disclosed in literature by V. Santhanam et al., "Data Prefetching on the HP PA-8000", in Proceedings of the 24th Annual International Symposium on Computer Architecture, pp. 264–273, 1997, issuing of a prefetch instruction for referring to the same cache line is reduced and a prefetch instruction is generated.

In step 408, whether the indirect reference in the loop is continuous or not is determined. As described above, the invention has been achieved by paying attention that the values of elements of an index array are not completely discrete values but almost continuous values when seen locally such as {1, 2, 3, 4, 6, 7, 8, 9, 51, 52, 53, 54, 56 . . . }. In the example, the values have to be determined as "continuous" without regarding the gap between 10 and 50.

The determination is preferably realized by methods as described below.

Figure 5:
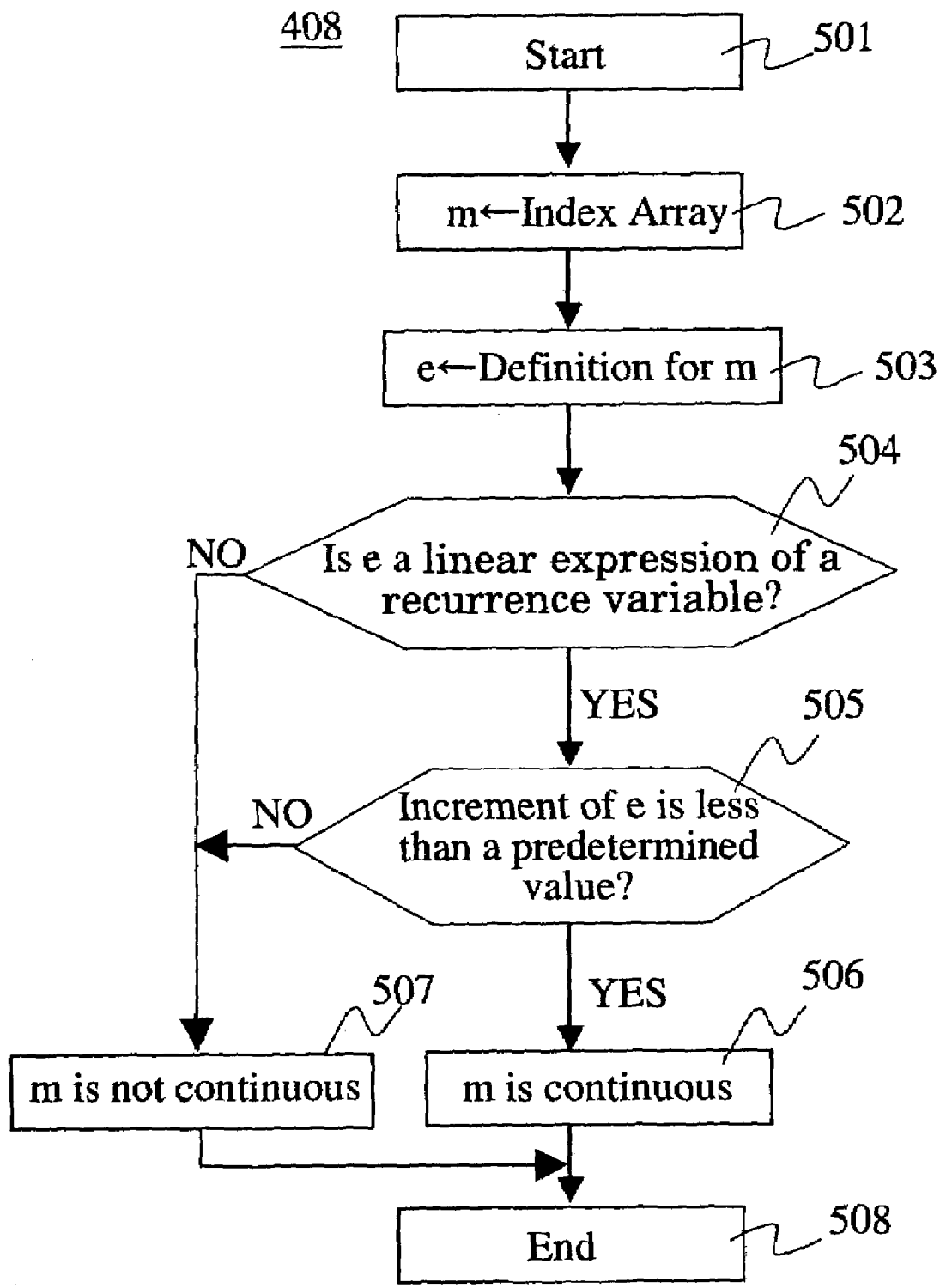
FIG. 5 is a diagram showing an example of the flow of a process for determining whether indirect reference in a loop is continuous or not in the invention.

(1) automatic determination by analyzing code of a source program
(2) instruction by the user as a compiler option
(3) instruction by the user on source code by a compiler directive
(4) user's dialogue instruction on presented source code FIG. 5 shows the processing flow 408 of the case (1) where automatic analysis is made by the compiler. The automatic analyzing process of FIG. 5 is started in step 501, and an array to be analyzed is assigned to a variable m in step 502. Subsequently, in step 503, an expression for defining (m) is obtained and assigned to a variable (e). In step 504, the equation (e) is a linear expression of "$i*\alpha+\beta$" or not is checked. It is assumed that (i) denotes here a recurrence variable. If the expression is not a linear expression, the control shifts to step 507 where it is determined that (m) is not continuous. The control shifts to step 508 and the processing is finished. If the expression is a linear expression, whether an increment value $|\alpha|$ of (e) is less than a predetermined value or not is determined. If YES, the control shifts to step 506 where (m) is determined as continuous. In step 508, the processing is finished. If $|\alpha|$ is not less than the predetermined value, the control is shifted to step 507 where (m) is determined as discontinuous, and the processing is finished in step 508. As an example, it is assumed that the loop for defining the index array L is that shown in FIG. 8. Since the expression of defining an index of L is "$i*2$", it is understood that the increment value of the index is 2. When it is assumed that a determination value of the threshold for determining continuity is 4, the indirect reference using L as an index array is recognized as an object to which prefetching is applied.

FIG. 6 shows an example of an instruction by the compiler option of (2) described above. In the example, the increment value of the index array L is indicated as 2 by an option. A compiler determines whether prefetching can be applied or not on the basis of the increment value in a manner similar to the case of the above-described automatic analysis.

Similarly, FIG. 7 shows an example of use of the compiler directive in the above-stated (3). In the example, the directive of "*option increase (L,2)" indicates that the increment value of the index array L in the subsequent loop is 2. In a manner similar to the example of FIG. 5, on the basis of the increment value, whether prefetching can be applied or not is determined.

In the case where the user give a directive instruction to a loop as shown in FIG. 7, the user may describe the directive directly in the source program. As described in (4), when a loop including an indirect reference recognized in the indirect reference recognizing process 103 in FIG. 1 is displayed on the display of a computer, it is also possible that the user instructs prediction of a change amount of the index with respect to each indirect reference in an interactive manner.

FIG. 9 shows code as a result of realizing optimization by applying the invention to the case of FIG. 3A. It is assumed that the increment value of the index array L of indirect reference A[L[i]] is found to be 2 as a result of automatic analysis of the index array or analysis of a user instruction by a directive or the like. Assuming now that the size of the cache line is 32 bytes and the length of data to be referred to is 4 bytes, when the loop is unrolled four times and, as shown in FIG. 9, prefetching of the arrays L and A is performed each time the original source code is repeated four times. Consequently, as obviously understood in comparison with FIG. 3C that, while reducing an instruction overhead caused by prefetching, prefetching of the indirect reference can be performed.

According to the invention, by effectively applying data prefetching to a program which performs indirect array reference, the execution performance of the program can be improved.

The invention claimed is:

1. A data prefetch method for generating a prefetch instruction for indirect reference in a program, comprising the steps of:
    recognizing a loop structure in the program;
    recognizing an indirect reference in the loop; and
    generating a prefetch instruction for the recognized indirect reference, the generating step further comprising:
    checking to see whether the indirect reference indicates continuous or not; and
    generating the prefetch instruction only for the indirect reference if the result of the checking step indicates continuous,
    wherein a compiler automatically determines, by analyzing code of a source program, whether the result of the checking step is continuous, if values indicated by an index array referred in the indirect reference stand along a linear expression, and if an increment of the values is less than a predetermined value.

2. A data prefetch method for generating a prefetch instruction for indirect reference in a program, comprising the steps of:
    recognizing a loop structure in the program;
    recognizing an indirect reference in the loop; and
    generating a prefetch instruction for the recognized indirect reference, the generating step further comprising:
    checking to see whether the indirect reference indicates continuous or not; and generating the prefetch instruction only for the indirect reference if the result of the checking step indicates continuous, wherein a compiler determines, based on a compiler option instructed by a user, whether the result of the checking step is continuous, and if an increment of values indicated by an index array referred in the indirect reference is less than a predetermined value.

3. A data prefetch method for generating a prefetch instruction for indirect reference in a program, comprising the steps of:

recognizing a loop structure in the program;

recognizing an indirect reference in the loop; and generating a prefetch instruction for the recognized indirect reference, the generating step further comprising:

checking to see whether the indirect reference indicates continuous or not; and generating the prefetch instruction only for the indirect reference if the result of the checking step indicates continuous, wherein a compiler determines, based on a compiler directive on a source code instructed by a user, whether the result of the checking step is continuous, and if an increment of values indicated by an index array referred in the indirect reference is less than a predetermined value.

* * * * *